(12) United States Patent
Streckert et al.

(10) Patent No.: US 11,008,104 B2
(45) Date of Patent: May 18, 2021

(54) SYSTEM FOR CONTROLLING AN AIRCRAFT PASSENGER SEAT UNIT

(71) Applicant: RECARO Aircraft Seating GmbH & Co. KG, Schwaebisch Hall (DE)

(72) Inventors: Michael Streckert, Schwaebisch Hall (DE); Juergen Mehmel, Schwaebisch Hall (DE); Michael Gerngross, Michelfeld (DE); Joerg Laubenberger, Murrhardt (DE); Michael Hoppe, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 616 days.

(21) Appl. No.: 15/565,951

(22) PCT Filed: Apr. 7, 2016

(86) PCT No.: PCT/EP2016/057550
§ 371 (c)(1),
(2) Date: Feb. 27, 2018

(87) PCT Pub. No.: WO2016/165998
PCT Pub. Date: Oct. 20, 2016

(65) Prior Publication Data
US 2018/0170550 A1 Jun. 21, 2018

(30) Foreign Application Priority Data
Apr. 13, 2015 (DE) .................... 10 2015 105 617.8

(51) Int. Cl.
*B64D 11/06* (2006.01)
*B64D 11/00* (2006.01)
(Continued)

(52) U.S. Cl.
CPC ........ *B64D 11/0639* (2014.12); *B60N 2/0228* (2013.01); *B64D 11/0015* (2013.01);
(Continued)

(58) Field of Classification Search
CPC ..... H04L 69/22; H04L 45/7457; H04L 47/20; H04L 12/1886; H04L 45/16;
(Continued)

(56) References Cited

U.S. PATENT DOCUMENTS 6,243,635 B1 * 6/2001 Swan .................... B60N 2/002
701/49
6,929,218 B1 8/2005 Sanford et al.
(Continued)

FOREIGN PATENT DOCUMENTS

DE 10 2011 118 754 A1 5/2013
DE 10 2012 024 641 A1 6/2014
(Continued)

OTHER PUBLICATIONS

Office Action dated Jul. 12, 2019 issued in corresponding EP patent application No. 16 715 834.4 (and English translation).
(Continued)

*Primary Examiner* — Jeff A Burke
*Assistant Examiner* — Kyle T Johnson
(74) *Attorney, Agent, or Firm* — Posz Law Group, PLC

(57) ABSTRACT

An aircraft device includes at least one control and/or regulation unit which is configured for controlling an aircraft passenger seat unit, and of a PED in which at least one operating program is stored, wherein the control and/or regulation unit is configured to receive control signals from the PED for controlling the aircraft passenger seat unit.

17 Claims, 3 Drawing Sheets

Figure 1:
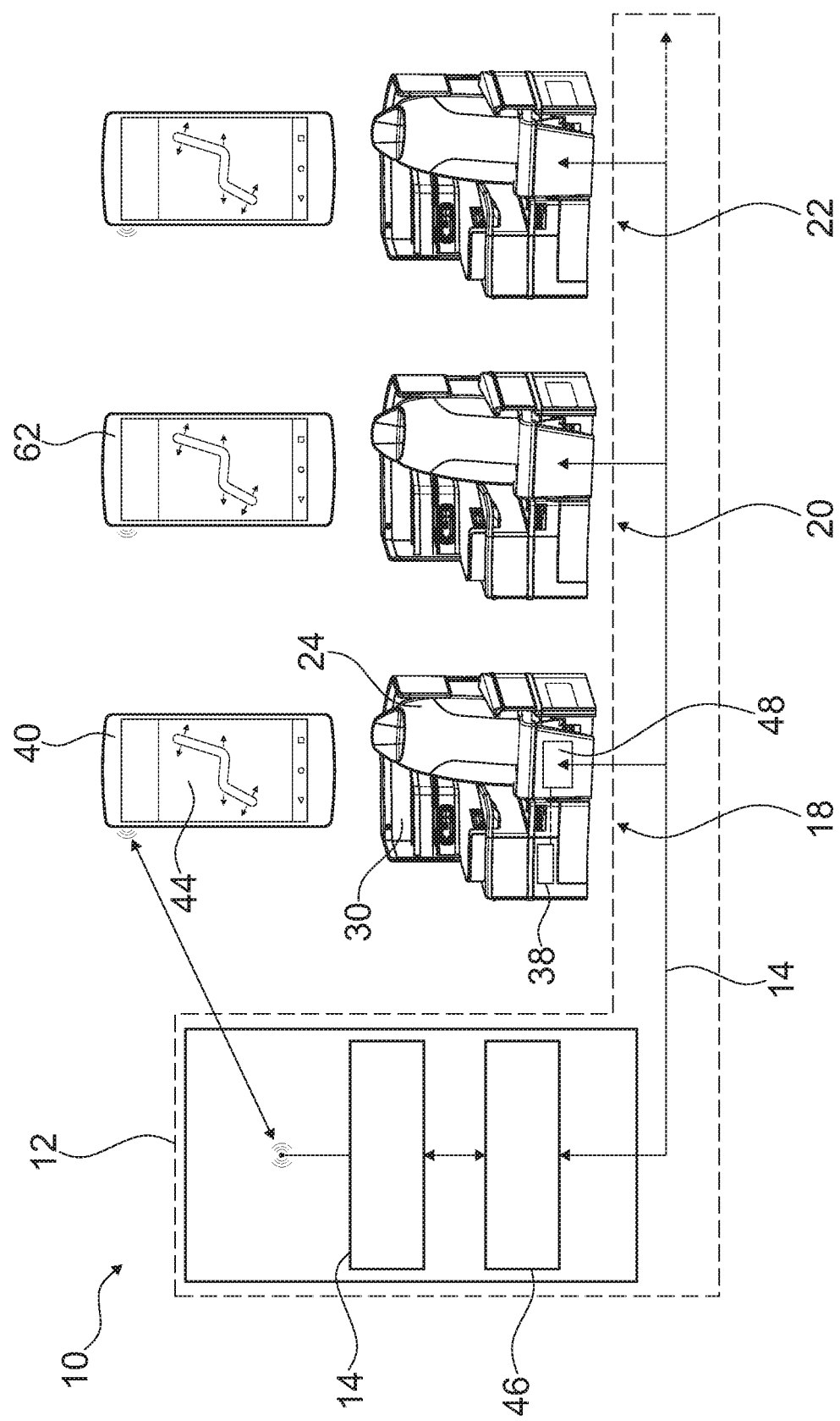

(51) Int. Cl.
*H04N 21/4363* (2011.01)
*H04N 21/214* (2011.01)
*H04N 21/436* (2011.01)
*H04N 21/41* (2011.01)
*B60N 2/02* (2006.01)
*H04N 21/414* (2011.01)
*H04L 12/40* (2006.01)
*H04L 29/08* (2006.01)

(52) U.S. Cl.
CPC ......... *B64D 11/06* (2013.01); *H04N 21/2146* (2013.01); *H04N 21/4126* (2013.01); *H04N 21/41422* (2013.01); *H04N 21/43615* (2013.01); *H04N 21/43637* (2013.01); *H04L 12/40* (2013.01); *H04L 67/12* (2013.01)

(58) Field of Classification Search
CPC ... H04L 61/6068; H04L 49/25; H04L 12/185; H04L 49/358; H04L 49/201; H04L 12/4641; H04L 49/70; H04L 45/745; G06F 2201/88
See application file for complete search history.

(56) References Cited

U.S. PATENT DOCUMENTS

| | | | | |
|---|---|---|---|---|
| 2007/0266782 | A1* | 11/2007 | Bartz | G06Q 10/087 73/156 |
| 2009/0132697 | A1* | 5/2009 | Scheid | H04L 63/104 709/224 |
| 2011/0106375 | A1* | 5/2011 | Gurusamy Sundaram | H04W 4/60 701/31.4 |
| 2013/0063612 | A1* | 3/2013 | Royster | H04N 21/2146 348/207.99 |
| 2014/0172242 | A1 | 6/2014 | Fruwald et al. | |
| 2014/0242910 | A1 | 8/2014 | Umlauft et al. | |
| 2014/0282684 | A1* | 9/2014 | Keen | H04N 21/2146 725/30 |
| 2015/0017915 | A1* | 1/2015 | Hennequin | G08C 17/02 455/41.2 |
| 2016/0329724 | A1* | 11/2016 | Ibrahim | H02J 7/007 |
| 2017/0008641 | A1* | 1/2017 | Santana-Gallego | B64D 11/0619 |
| 2017/0105540 | A1* | 4/2017 | Jacobs | A47C 1/0355 |
| 2018/0170550 | A1* | 6/2018 | Streckert | H04N 21/2146 |
| 2020/0339266 | A1* | 10/2020 | McMillan | B64D 11/0639 |

FOREIGN PATENT DOCUMENTS

| | | |
|---|---|---|
| DE | 10 2013 203 226 A1 | 8/2014 |
| DE | 10 2013 212 765 A1 | 12/2014 |
| DE | 10 2014 208 347 A1 | 11/2015 |
| WO | 2012/048100 A2 | 4/2012 |
| WO | 2014/162193 A1 | 10/2014 |
| WO | 2015/145142 A1 | 10/2015 |

OTHER PUBLICATIONS

Search Report dated Mar. 17, 2016 issued in corresponding DE patent application No. 10 2015 105 617.8 (and partial English translation).

International Search Report of the International Searching Authority dated Jun. 30, 2016 issued in corresponding International Application No. PCT/EP2016/057550 (English translation only).

International Preliminary Report on Patentability dated Oct. 26, 2017 issued in corresponding International Application No. PCT/EP2016/057550 (English translation only).

* cited by examiner

SYSTEM FOR CONTROLLING AN AIRCRAFT PASSENGER SEAT UNIT

CROSS REFERENCE TO RELATED APPLICATIONS

This application is a U.S. national stage application of PCT/EP2016/057550 filed on Apr. 7, 2016, which is based on German Patent Application No. 10 2015 105 617.8 filed on Apr. 13, 2015, the contents of which are incorporated herein by reference.

STATE OF THE ART

The invention relates to a system according to the preamble of patent claim 1.

A system consisting of an aircraft device comprising at least one control and/or regulation unit which is configured for controlling an aircraft passenger seat unit, and of a PED in which at least one operating program is stored, has already been proposed.

The objective of the invention is in particular to provide a generic device with improved characteristics regarding comfort and operability. The objective is achieved, according to the invention, by the features of patent claim 1, while advantageous implementations and further developments of the invention will become apparent from the subclaims.

Advantages of the Invention

The invention is based on a system composed of an aircraft device comprising at least one control and/or regulation unit which is configured for controlling an aircraft passenger seat unit, and of a PED in which at least one operating program is stored.

It is proposed that the control and/or regulation unit is configured to receive control signals from the PED for controlling the aircraft passenger seat unit.

An "aircraft device" is herein in particular to mean a part, in particular an electrical and/or electronic part, of an aircraft, in particular of an aircraft cabin. By a "control and/or regulation unit" is in particular a unit with at least one controlling apparatus to be understood. A "controlling apparatus" is in particular to mean a unit with a processing unit, with a storage unit and with an operating program which is stored in the storage unit. Principally the control and/or regulation unit may comprise a plurality of interconnected controlling apparatus which are preferentially configured to communicate with each other via a bus system, e.g. in particular a CAN bus system. By an "aircraft passenger seat unit" is herein in particular a unit to be understood which comprises at least one air aircraft passenger seat and its periphery. An aircraft passenger seat unit herein preferably comprises a shell module en-compassing the aircraft passenger seat and comprises add-on components of the aircraft passenger seat unit, e.g. depositing facilities and stowage facilities, and comprises, for example, an entertainment module. By a "PED" is herein in particular a mobile electronic device to be understood, like in particular a tablet computer, a smartphone, an e-book reader, a smartwatch, a head-mounted display or any other mobile electronic device deemed expedient by someone skilled in the art. The PED herein comprises an internal memory on which an operation system is stored, via which the PED is controllable and operable, thus comprising an interface between a hardware of the PED and the user software stored on the PED. The PED preferentially comprises an output unit, like in particular a monitor screen, and comprises an input unit via which input may be carried out, the input unit and the output unit being preferably implemented integrally, as a touch-screen. By an "operating program" is herein in particular a user software to be understood which is stored on the PED and is implementable on the PED by means of the PED operation system. The operating program is herein preferably implemented as an application which may be downloaded to and installed on the PED from an electronic storage. By an "operating program being stored on the PED" is herein in particular to be understood that the operating program is at least partly stored and installed in an internal storage of the PED, and that the operating program is implementable on the PED. By a "control signal" is herein in particular an electrical and/or electronic signal to be understood, which is configured to carry information configured to accordingly actuate an element that is to be operated. "To receive control signals for controlling" is herein in particular to mean that the control and/or regulation unit receives respective control signals via data input, then processes said signals and converts them into corresponding output signals for an element that is to be controlled, and then supplies the output signals to the element that is to be controlled. "Configured" is in particular to mean specifically programmed, designed and/or equipped. By an object being configured for a certain function is in particular to be understood that the object fulfills and/or implements said certain function in at least one application state and/or operating state. By an implementation according to the invention the aircraft passenger seat unit may be operated via a passenger's PED, which is equipped with the operating program, in a particularly simple and advantageous manner. This in particular allows increasing a passenger's comfort.

It is further proposed that the aircraft device comprises at least one communication module, via which the PED is wirelessly couplable with the aircraft device. By a "communication module" is herein in particular a module to be understood which is configured for an electrical and/or electronic communication of electrical and/or electronic structural components of the aircraft device. Herein the communication module of the aircraft device preferably comprises electrical multi-core lines, e.g. in particular Ethernet cables, connecting various parts of the aircraft device, like in particular aircraft passenger seat units, with a central control and/or regulation unit of an aircraft. The communication module of the aircraft device further comprises a WLAN module, which is configured to provide a wireless network allowing in particular PEDs to be connected to and thus to communicate with the communication module. "Wirelessly couplable" is herein in particular to mean connected to each other via a wireless connection, wherein data may be exchanged via the wireless connection. This allows connecting the PED to the aircraft device in a particularly simple fashion.

It is also proposed that a plurality of PEDs are wirelessly couplable with the aircraft device via the communication module for the purpose of actuating different aircraft passenger seat units. In this way for each aircraft passenger seat a separate PED may be advantageously connected to the aircraft device for the purpose of controlling.

Beyond this it is proposed that the operating program of the PED is configured to communicate via the communication module with only one aircraft passenger seat unit. "To communicate with only one aircraft passenger seat unit" is herein in particular to mean that, at a certain point in time, the operating program communicates only with one aircraft passenger seat unit, in particular with a control and/or regulation unit of the aircraft passenger seat unit. It is herein possible that, following separation from the one aircraft passenger seat unit, the PED is connected to another aircraft passenger seat unit via the communication module and then communicates with this one only. In this way it may advantageously be ensured that an aircraft passenger seat unit is controllable by only one PED.

It is moreover proposed that the operating program of the PED is configured to be unambiguously allocated to one single aircraft passenger seat unit by a pairing process. By a "pairing process" is herein in particular a process to be understood in which precisely one aircraft passenger seat unit is allocated to the operating program on the PED, for the purpose of allowing the operating program to be coupled with precisely this aircraft passenger seat unit for controlling. Herein, in the pairing process an unambiguous identification of the aircraft passenger seat unit is transmitted to the operating program, as a result of which the operating program is enabled to actuate the respectively allocated aircraft passenger seat unit via the communication module of the aircraft device. It is in this way advantageously achievable that exactly the aircraft passenger seat unit desired is controllable via the operating program of the PED in a simple, comfortable fashion.

Furthermore it is proposed that, in the pairing process, the operating program of the PED is configured to process a pairing code supplied by the aircraft passenger seat unit and to output a corresponding signal to the communication module of the aircraft device. A "pairing code" is herein in particular to mean a code which may be received by the PED via an input unit and which contains information that is unambiguous due to corresponding interpretation. The pairing code is herein preferentially implemented as a visual code but may principally also be implemented as an acoustical code or as a code composed of electro-magnetic waves. The pairing code is herein preferably implemented as a QR code. Principally it is also conceivable that the pairing code is implemented as a barcode, as a code composed of letters, numbers and other signs, or as a different type of code which is optically capturable and is deemed expedient by someone skilled in the art. To capture the pairing code, the PED comprises an input unit, which is preferentially embodied as a camera. Principally it is also conceivable that the input unit is embodied as a unit for input-ting the code manually, e.g. as a keyboard or as a touch-screen. It is principally also conceivable that the pairing code is implemented as a digital code, which is transmitted directly between the PED and the aircraft passenger seat unit via near-field communication (NFC). In such a case the aircraft passenger seat unit as well as the PED would each comprise an NFC module, the NFC modules respectively communicating with one another wirelessly. In this case the NFC module of the aircraft passenger seat unit would preferably be arranged in a PED holder. "To process" is herein in particular to mean that the PED obtains information encoded in the pairing code by corresponding de-coding. "Supplied" is herein in particular to mean that the pairing code is displayed and/or shown in a place of the aircraft passenger seat unit that is preferably easily reachable for a passenger. It is herein conceivable that the pairing code is permanently displayed on the aircraft passenger seat unit, e.g. by an imprint applied on the aircraft passenger seat unit, or is temporarily displayed and/or shown on the aircraft passenger seat unit via a display means. By a "corresponding signal" is in this context a signal to be understood by which the communication module of the aircraft device may unambiguously determine the aircraft passenger seat unit which the signals of the operating program of the PED must be forwarded to. This allows implementing a pairing process in a particularly simple manner.

Beyond this it is proposed that the system comprises at least one aircraft passenger seat unit comprising at least one indicating element, which is configured to supply the pairing code for the pairing process. By an "indicating element" is herein in particular an element to be understood which is capable of indicating and/or displaying the pairing code visually and/or acoustically. An indicating element may herein be embodied as a display means which is attached to the aircraft passenger seat unit permanently and unchangeably, e.g. as a stick-on label or as an imprint. Preferentially the indicating element is embodied as a display which is arranged on the aircraft passenger seat unit in such a way that it is easily visible to a passenger. Via the indicating element that is embodied as a display, the pairing code supplied by the control and/or regulation unit may be calculated and outputted for each pairing process anew. Herein the indicating element, via which the pairing code is outputted, is preferably implemented integrally with an indicating element of an entertainment module of the aircraft passenger seat unit. This allows supplying the passenger with the pairing code in a particularly simple fashion.

It is also proposed that the pairing code comprises at least one parameter, which is configured for an identification of the corresponding aircraft passenger seat unit. By a "parameter" is herein in particular an information package to be understood which has been introduced into the pairing code in an encoded manner and which may be used by the operating program of the PED by decoding the pairing code. By a "parameter for an identification of the aircraft passenger seat unit" is herein in particular an information package to be understood which is unambiguously allocatable to an aircraft passenger seat unit, e.g. an ID of the aircraft passenger seat unit which is allocated to the aircraft passenger seat unit in the aircraft network by the communication module of the aircraft device, or a seat number of the corresponding aircraft passenger seat in the aircraft. This allows a quick and unambiguous identification of the corresponding aircraft passenger seat unit via the pairing code.

Moreover it is proposed that the pairing code comprises at least one further parameter-showing an equipment of the aircraft passenger seat unit. By a "parameter showing an equipment of the aircraft passenger seat unit" is herein in particular an information package to be understood, the processing of which allows the operating program to unambiguously determine the operable modules comprised by the aircraft passenger seat unit, e.g. in particular an actuator module, a light module, an entertainment module or a comfort module. In this way it is advantageously possible to transmit to the operating program, which equipment comprised by a respective aircraft passenger seat unit, thus allowing the operating program to automatically show or hide corresponding potential settings for the aircraft passenger seat unit.

It is further proposed that the aircraft passenger seat unit comprises at least one operating element, which must be operated for generating the pairing code. By an "operating element" is herein in particular an element to be understood which is manually operable by a passenger. By an actuation of the operating element, a pairing code is generated by the control and/or regulation unit and is displayed for the passenger on the corresponding indicating element. The operating element may herein be embodied as a separate operating element, e.g. as a push button, or may preferably be embodied as a button on an indicating element of an entertainment system, which is embodied as a touch-screen. This advantageously allows indicating the pairing code if a passenger wishes to carry out a pairing process.

Furthermore it is proposed that the PED and/or the aircraft device is configured for establishing an encoded connection between the PED and the one aircraft passenger seat unit which is to be operated. By an "encoded connection" is herein in particular a secure connection to be understood which provides the greatest possible security that data exchanged between the PED and the aircraft device cannot be accessed and/or manipulated by a third party. This advantageously allows preventing third parties from joining a communication between the PED and the aircraft device.

Beyond this it is proposed that the operating program of the PED is at least configured for actuating a light control unit of the respective aircraft passenger seat unit. By a "light control unit" is herein in particular a control unit to be understood which is configured to actuate a light module of the aircraft passenger seat unit. The light control unit is herein part of the control and/or regulation unit of the aircraft passenger seat unit. In this way a lighting of the aircraft passenger seat unit is advantageously adjustable via the operating program.

It is also proposed that the operating program of the PED is at least configured for actuating a seat position control unit of the respective aircraft passenger seat unit. By a "seat position control unit" is herein in particular a control unit to be understood which is configured to actuate an actuator module of an aircraft passenger seat of the aircraft passenger seat unit. The seat position control unit is herein part of the control and/or regulation unit of the aircraft passenger seat unit. In this way an adjustment of the aircraft passenger seat of the aircraft passenger seat unit is advantageously adjustable via the operating program.

It is further proposed that the operating program of the PED is at least configured to comprise a maintenance function, which is configured to read out at least one maintenance-relevant parameter from the aircraft passenger seat unit. By a "maintenance function" is herein in particular a user interface to be understood which is in particular configured for a maintenance of aircraft passenger seat units in an aircraft cabin. The maintenance function is herein configured in a specific operating program arranged only for appropriately authorized persons. By a "maintenance-relevant parameter" is herein in particular a parameter to be understood which needs to be regularly read out and recorded in a maintenance procedure, e.g. a serial number of the aircraft passenger seat unit, a status of the different modules of the aircraft passenger seat unit or an energy consumption of the aircraft passenger seat unit. This advantageously allows providing a tool that simplifies a maintenance procedure of aircraft passenger seat units.

It is moreover proposed that the operating program of the PED renders at least one operating cluster available. By an "operating cluster" is herein in particular a button to be understood which is provided in the operating program and via actuation of which by a passenger a control signal is outputted to the corresponding aircraft passenger seat unit, the control signal adjusting at least one operative parameter, preferably a plurality of operative parameters of the aircraft passenger seat unit. In this way easy operability by the operating program is advantageously achievable.

Furthermore it is proposed that the at least one operating cluster comprises a plurality of operative parameters of the aircraft passenger seat unit. By "operative parameter" is herein in particular a parameter to be understood which represents a defined setting of a module of the aircraft passenger seat unit that is to be adjusted. Herein an operative parameter may comprise a seat position of the aircraft passenger seat, a defined light setting of the light module or a certain setting of the entertainment system. This advantageously allows implementing a plurality of adjustments of the seat unit by actuating an operating cluster and thus allows a passenger selecting a variety of base positions of the aircraft passenger seat unit simply and quickly.

It is also proposed that the operating program of the PED is configured to memorize a user's favorite settings for an aircraft passenger seat unit. "Memorize favorite settings" is herein in particular to mean that a passenger may store his individual favorite settings in an operating cluster in the operating program wherein, on actuating the respective operating cluster, the aircraft passenger seat unit is adjustable to the corresponding memorized settings. This allows a passenger adjusting the aircraft passenger seat unit to his personal settings in an advantageously quick fashion.

It is further proposed that the aircraft passenger seat unit comprises at least one operating module, which is configured for outputting control signals to the control and/or regulation unit, wherein the control signals of the operating module override control signals of a PED that is coupled with the aircraft passenger seat unit. By an "operating module" is herein in particular a module to be understood, comprising a plurality of operating elements which are configured for directly controlling the aircraft passenger seat unit and are for this purpose arranged on the aircraft passenger seat unit within easy reach for a passenger. "Override" is herein in particular to mean that the control signals of the operating module of the aircraft passenger seat unit have a higher priority, as a result of which control signals of the aircraft passenger seat unit entered via the operating module are processed by the control and/or regulation unit with priority and control signals of the operating program of the PED, which may be transmitted to the control and/or regulation unit in the same time interval, are not processed. Adjustments of the aircraft passenger seat unit which have been initiated by control signals of the operating program of the PED and are negated by control signals of the operating module, are immediately terminated and the respective control signals of the operating module are processed by the control and/or regulation unit. In this way it is advantageously achievable that a setting of the aircraft passenger seat unit is eventually always determinable by the passenger sitting on the respective aircraft passenger seat unit.

The system according to the invention is herein not to be restricted to the application and implementation described above. In particular, to fulfill a functionality herein described, the system according to the invention may comprise a number of respective elements, structural components and units that differs from a number that is mentioned herein.

DRAWINGS

Further advantages will become apparent from the following description of the drawings. The drawings show an exemplary embodiment of the invention. The drawings, the description and the claims contain a plurality of features in combination. Someone skilled in the art will purposefully also consider the features separately and will find further expedient combinations.

Figure 2:
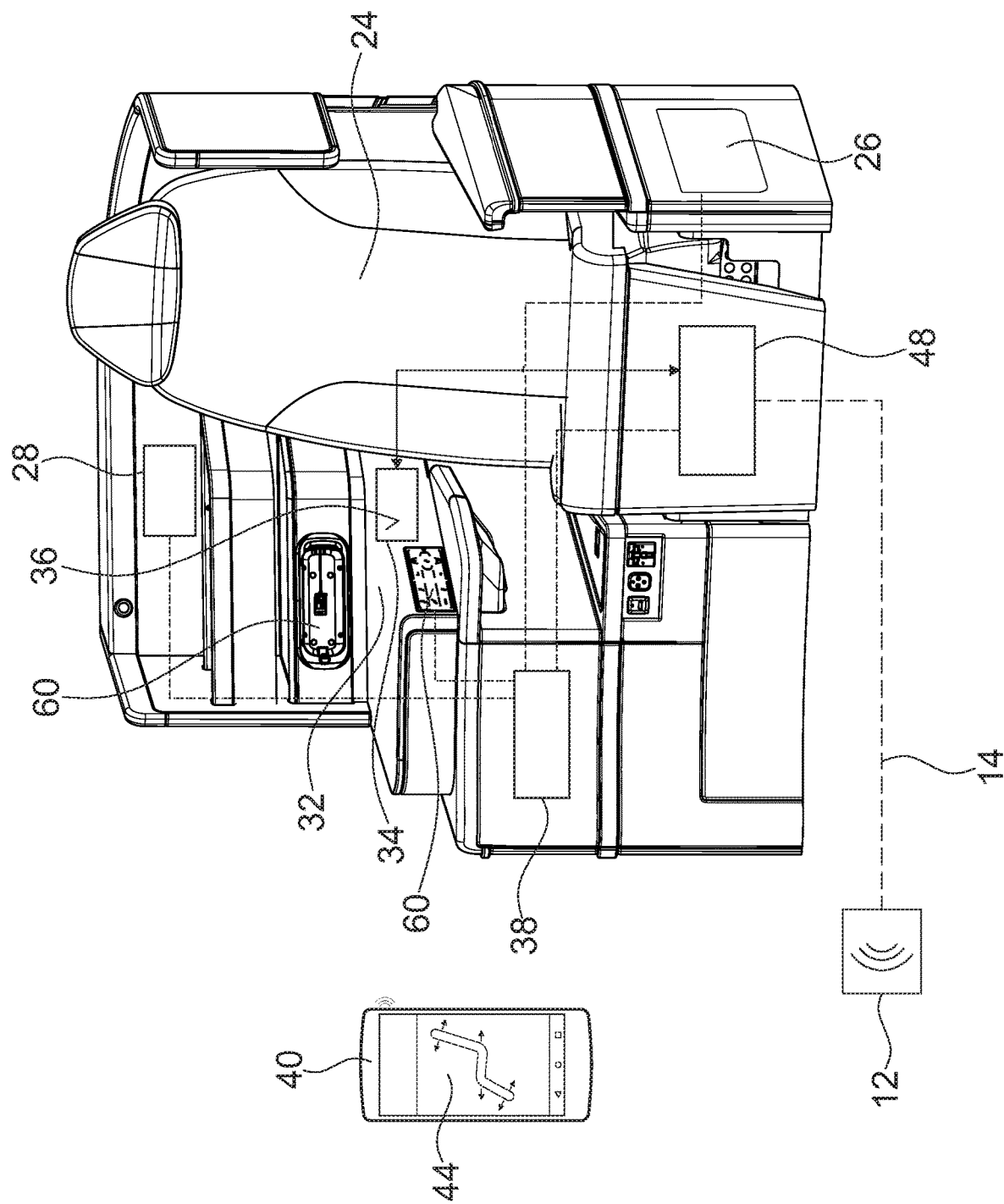
Figure 3:
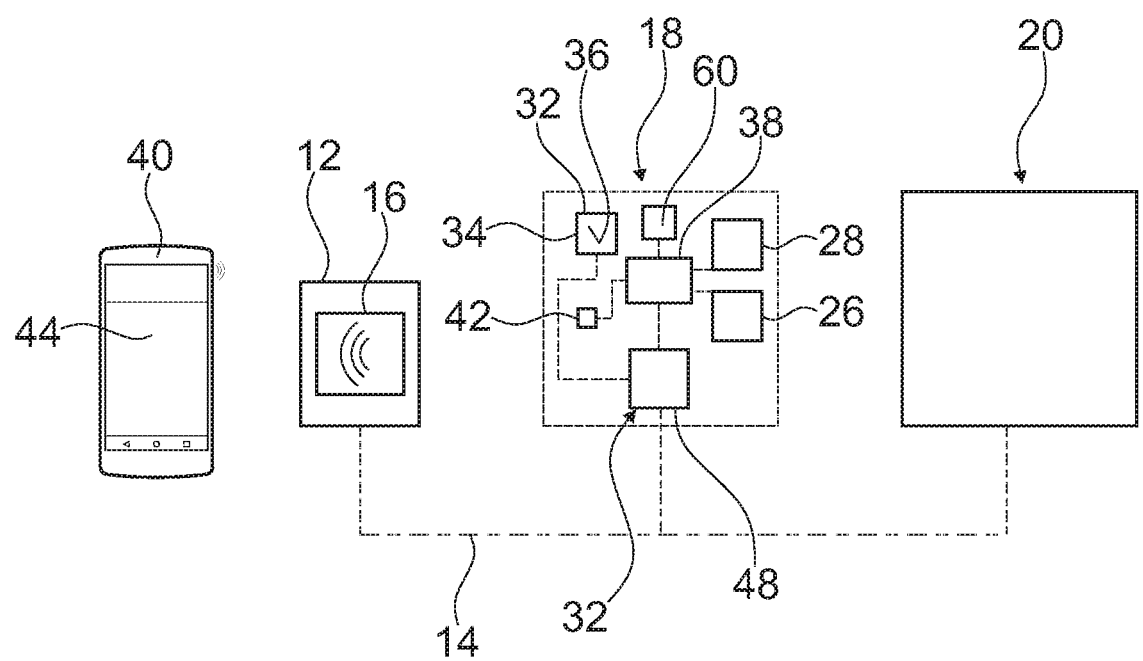
Figure 4:
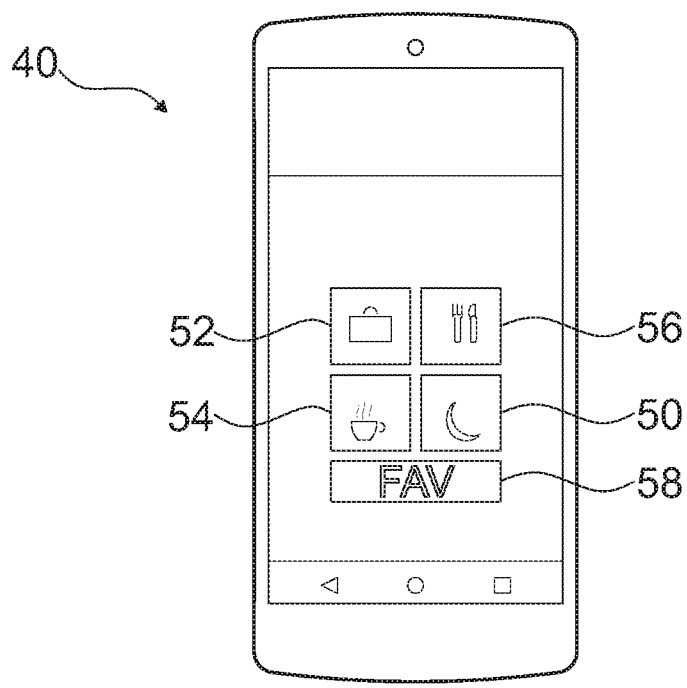

It is shown in:

FIG. 1 a schematic representation of a system according to the invention with an aircraft module, and a plurality of aircraft passenger seat units and PEDs, FIG. 2 a schematic representation of an aircraft passenger seat unit and a PED, FIG. 3 a schematic representation of the system according to the invention in a block chart, and FIG. 4 a schematic representation of the PED with a user interface of an operating program.

DESCRIPTION OF THE EXEMPLARY EMBODIMENT

FIGS. 1 to 4 show a system according to the invention. The system comprises an aircraft device 10. FIG. 1 shows a portion of an aircraft with an aircraft device 10. The aircraft device 10 is embodied as part of the aircraft. The aircraft device 10 comprises a communication module 12. The communication module 12 comprises a wiring 14. The wiring 14 is implemented by Ethernet cables connecting the various elements of the aircraft device 10 which are to be actuated in the aircraft cabin. The wiring is part of an in-flight entertainment system. The wiring 14 realizes an IFE Ethernet backbone. The communication module 12 comprises a control and regulation unit 46. The control and regulation unit 46 is also part of the in-flight entertainment system. The control and regulation unit 46 is configured to build a network in the aircraft device 10, to process corresponding information and to forward the information to the respective elements. The communication module 12 comprises a communicating unit 16. The communicating unit 16 is configured to make a wireless network available in the aircraft cabin. The communicating unit 16 provides a WLAN network. For this purpose the communicating unit 16 comprises a control unit (not shown in detail) and antennae (not shown in detail), via which the WLAN network may be built in the aircraft cabin. The communicating unit 16 is connected to the wiring 14. Thus all elements in the aircraft cabin which are to be actuated and are connected to the wiring 14 may be accessed via the communicating unit 16.

The system comprises a plurality of aircraft passenger seat units 18, 20, 22. FIG. 1 shows exemplarily three aircraft passenger seat units 18, 20, 22. There are further aircraft passenger seat units arranged in the aircraft cabin, which are not shown in detail and which may be implemented in the same way as the aircraft passenger seat units 18, 20, 22 shown. Principally it is also conceivable that further aircraft passenger seat units are implemented differently from the aircraft passenger seat units 18, 20, 22 shown. In the following only the aircraft passenger seat unit 18 will be described in detail. The aircraft passenger seat unit 18 comprises an aircraft passenger seat 24. The aircraft passenger seat 24 is configured for a passenger to sit on it, in particular during a flight. The aircraft passenger seat 24 comprises a seat bottom, a backrest which is pivotally adjustable with respect to the seat bottom and a pivotable footrest. The aircraft passenger seat 24 has an upright seat position, which is embodied as a TTL position, and a lying-down position. The aircraft passenger seat 24 is continuously adjustable between the upright seat position and the lying-down position. For an adjustment into the different seat positions, the seat bottom, the backrest and the footrest of the aircraft passenger seat 24 are adjusted accordingly with respect to one another. For an adjustment of the aircraft passenger seat 24, the aircraft passenger seat 24 comprises an actuator module 26. The actuator module 26 comprises a plurality of separately controllable actuators, which are connected to the seat bottom, the backrest and the footrest, for moving the seat bottom, the backrest and the footrest.

The aircraft passenger seat unit 18 further comprises a shell module 30. The shell module 30 encompasses the aircraft passenger seat 24. The shell module 30 forms a seat area of the aircraft passenger seat unit 18, which is available to the passenger sitting on the aircraft passenger seat 24. The shell module 30 implements different depositing elements and support elements. The aircraft passenger seat unit 18 further comprises a light module 28. The light module 28 comprises a plurality of light elements. The light elements are configured to illuminate the seat area of the aircraft passenger seat unit 18. Herein the light module 28 comprises at least one light element which is implemented as a reading light. The light element which is implemented as a reading light is configured to illuminate a portion of the seat area directly to allow the passenger to read and/or work. Furthermore the light module 28 comprises at least one light element which is implemented as a background light. The light element which is implemented as a background light is configured to illuminate the seat area indirectly. The light module 28 moreover comprises at least one light element which is implemented as an ambience light and is configured to provide different colors. The aircraft passenger seat unit 18 further comprises a comfort module. The comfort module comprises a massaging unit having massaging elements which are integrated in the aircraft passenger seat 24. The comfort module also comprises a heating unit, which is configured for heating the aircraft passenger seat 24. It is principally also conceivable that the aircraft passenger seat unit 18 and/or the aircraft passenger seat 24 comprises further adjustable elements, e.g. a headrest, an armrest, a privacy divider or other adjustable elements which are deemed expedient by someone skilled in the art.

The aircraft passenger seat unit 18 comprises an entertainment module 32. The entertainment module 32 is part of the in-flight entertainment system. The entertainment module 32 comprises an IFE (in-flight entertainment) control and regulation unit 48. The IFE control and regulation unit 48 is connected to the communication module 12 of the aircraft device 10 via the wiring 14. The IFE control and regulation unit 48 implements a connection of the communication module 12 of the aircraft device 10 to the aircraft passenger seat unit 18. The aircraft passenger seat unit 18 is actuatable by the aircraft device 10 via the IFE control and regulation unit 48. The entertainment module 32 comprises an indicating element 34. The indicating element 34 is embodied as a monitor screen. Herein the indicating element 34 is embodied as a touch-screen. The indicating element 34 which is embodied as a touch-screen is implemented as an input element 36. The indicating element 34 is configured for media contents to be represented thereon for an entertainment of the passenger. For example, media content provided by the in-flight entertainment system could be represented via the indicating element 34.

The aircraft passenger seat unit 18 comprises a control and regulation unit 38. The control and regulation unit 38 is configured to control the aircraft passenger seat unit 18. For this purpose the control and regulation unit 38 is electronically connected to the actuator module 26, the light module 28, the comfort module and the IFE control and regulation unit 38 of the entertainment module 32 of the aircraft passenger seat unit 18. The control and regulation unit 38 of the aircraft passenger seat unit 18 is connected to the communication module 12 of the aircraft device 10 via the IFE control and regulation unit 48. Information exchanged between the communication module 12, in particular the control and regulation unit 46 of the communication module 12, and the control and regulation unit 38 of the aircraft passenger seat unit 18 are transmitted via the IFE control and regulation unit 48. The IFE control and regulation unit 48 forms a gateway between the control and regulation unit 38 and the communication module 12 of the aircraft device 10. Principally it would also be conceivable that the control and regulation unit 38 is connected to the communication module 12 directly via the wiring 14. Principally it would also be conceivable that the control and regulation unit 38 of the aircraft passenger seat unit 18 and the IFE control and regulation unit 48 are embodied in a one-part implementation with one another. The control and regulation unit 38 is configured to output control signals to the respective modules 26, 28, 32 to carry out respective adjustments on the aircraft passenger seat unit 18. The aircraft passenger seat unit 18 comprises an operating module 60. The different functions of the aircraft passenger seat unit 18 are controllable by the control and regulation unit 38 via the operating module 60. The operating module 60 herein comprises a plurality of operating elements, via which a passenger may make inputs. It is principally also conceivable that the operating module 60 comprises only one operating element, e.g. implemented as a touch-screen. On input by the operator, the operating module 60 outputs control signals to the control and regulation unit 38, which processes said control signals and then outputs corresponding control signals to the respective modules 26, 28, 32. In this way a passenger may control the aircraft passenger seat unit 18 via the operating module 60.

The system according to the invention comprises a PED 40. The PED 40 is embodied as a personal electronic device. For the purposes of the present description, the PED 40 is embodied as a smartphone. Principally it is of course also conceivable that the PED 40 is embodied as any other personal electronic device deemed expedient by someone skilled in the art. The PED 40 is herein preferably embodied as an electronic device brought by the passenger. The PED 40 comprises a communication module (not shown), which is configured to connect the PED 40 to other devices in a wireless fashion. The communication module herein comprises different communicating units, via which the PED 40 is capable of communicating in a wireless fashion. The communication module of the PED 40 herein comprises a WLAN communicating unit, a Bluetooth® communicating unit and an NFC communicating unit. The communicating units are herein implemented corresponding to communicating units known from the prior art. It is of course principally also conceivable that the communication module of the PED 40 comprises further communicating units which are deemed expedient by someone skilled in the art. The PED 40 comprises a touch-screen element 44, which is embodied as an indicating unit and an operating element. Via the touch-screen element 44 it is possible to operate the PED 40 and to display information visually. The PED 40 comprises an internal memory unit. On the internal memory unit an operating program is stored. It is possible to start the operating program from an operating system of the PED 40. The operating program is implemented as an aircraft passenger seat area control application. By way of the operating program the passenger may control various functions of the aircraft passenger seat unit 18 via the PED. For this purpose the control and regulation unit 38 is configured to receive control signals from the PED 40 to control the aircraft passenger seat unit 18. The control signals received by the control and regulation unit 38 and output from the PED 40, which is operated by the passenger, are processed by the control and regulation unit 38, and the control and regulation unit 38 outputs corresponding control signals to the respective modules 26, 28, 32 of the aircraft passenger seat unit 18.

The PED 40 is couplable to the aircraft device 10 via the communicating unit 16 of the aircraft device 10. The PED 40 connects to the WLAN network provided by the communicating unit 16 via its WLAN communicating unit. Herein the PED 40 enters a safeguarded connection with the WLAN network provided by the communicating unit 16. Herein a plurality of PEDs 40 are simultaneously couplable to the aircraft device 10 via the WLAN network provided by the communicating unit 16. Via the WLAN network the operating program of the PED 40 is capable of communicating with the aircraft passenger seat units 18, 20, 22 via the communication module 12.

Herein the operating program of the PED 40 is configured to communicate via the communication module 12 with only one of the aircraft passenger seat units 18, 20, 22. The operating program is only couplable with one of the aircraft passenger seat units 18, 20, 22 at a time. For an unambiguous allocation of the PED 40 to the corresponding desired aircraft passenger seat unit 18, the operating program of the PED 40 is configured to be unambiguously allocated to one single aircraft passenger seat unit 18 by a pairing process. The aircraft passenger seat unit 18 is configured to supply a pairing code for the pairing process. The aircraft passenger seat unit 18 outputs the pairing code via the indicating element 34 of the entertainment module 32. The pairing code is herein embodied as a QR code. Principally it is also conceivable that the pairing code is embodied as a different code, e.g. as a barcode, a number code or a code composed of letters and numbers. The pairing code is configured for an unambiguous identification of the aircraft passenger seat unit 18 which it is indicated on. For this purpose the pairing code comprises a first parameter unambiguously identifying the aircraft passenger seat unit 18. The first parameter is herein implemented as an aircraft passenger seat unit 18 ID. The pairing code comprises a second parameter indicating an equipment of the aircraft passenger seat unit 18. Herein the second parameter indicates, in the case of the aircraft passenger seat unit 18, which type of actuator module 26, which type of light module 28, which type of comfort module and which type of entertainment module 32 is comprised by the aircraft passenger seat unit 18. The pairing code further comprises a code parameter. The code parameter comprises a public code parameter, which is to be transmitted to the PED 40 for the purpose of establishing an encoded connection to the aircraft passenger seat unit 18. Furthermore the pairing code comprises a random session ID, as a result of which each newly created pairing code is embodied differently from the pairing code previously created by the aircraft passenger seat unit 18. For the purpose of generating the pairing code, the aircraft passenger seat unit 18 comprises an operating element 42. By way of actuating the operating element 42, the control and regulation unit 38 generates the pairing code, outputting it via the indicating element 34. The operating element 42 is herein implemented by the input element 36 of the entertainment module 32, which is embodied as a touch-screen. Principally it is also conceivable that the operating element 42 is embodied as a separate operating element, e.g. as a push button inserted in the shell module 30 or in the aircraft seat 24.

The PED 40 comprises an input unit which is embodied as a camera. The operating program is configured to receive and process the pairing code of the aircraft passenger seat unit 18 via the input unit which is embodied as a camera. The operating program receives the pairing code via the input unit and decodes the parameters contained in the pairing code. By means of the first parameter for identifying the aircraft passenger seat unit 18, determined via the pairing code and of the code parameter, the operating program builds an encoded connection to the aircraft passenger seat unit 18, in particular to the control and regulation unit 38 of the aircraft passenger seat unit 18, via the communication module 12 of the aircraft device 10. When the operating program of the PED 40 is securely coupled with the aircraft passenger seat unit 18, a further coupling of the operating program and the aircraft passenger seat unit 18 is prevented. As a result, only one PED 40 is couplable to one of the aircraft passenger seat units 18, 20, 22 respectively.

The operating program of the PED 40 comprises a button which is configured to start a pairing process. In the following a pairing process will be described briefly by way of example. For starting the pairing process the passenger actuates the operating element 42. A signal outputted by the operating element 42 is processed by the control and regulation unit 38, which then generates a pairing code. The control and regulation unit 38 transmits the pairing code to the entertainment module 32, and the pairing code is displayed on the indicating element 34 in such a way that it is visible for the passenger. The passenger actuates on his PED 40 the button of the operating program which is configured for starting the pairing process. The operating program captures the pairing code by the input unit which is embodied as a camera and decodes the parameters contained in the pairing code. The operating program then sends a corresponding signal to the communication module 12 of the aircraft device 10, which uses the first parameter for identifying the aircraft passenger seat unit 18 and transmits the signal to the aircraft passenger seat unit 18. The control and regulation unit 38 of the aircraft passenger seat unit 18 processes the signal and builds an encoded connection to the operating program of the PED 40 in accordance with the code parameter sent by the operating program. When the encoded connection has been established between the operating program of the PED 40 and the IFE control and regulation unit 48, and thus with the control and regulation unit 38 as well, the control and regulation unit 38 ends the indication of the pairing code on the indicating element 34 of the entertainment module 32.

If the operating program of the PED 40 and the IFE control and regulation unit 48 are coupled with each other by means of the encoded connection, data sets may be exchanged in an encoded state between the operating program and the control and regulation unit 38. A connection between the operating program of the PED 40 and the control and regulation unit 38 is herein implemented as an optioned, encoded end-to-end communication with an optional bus protocol converter. The encoding of the data between the control and regulation unit 46 of the communication module 12 of the aircraft device 10 and the IFE control and regulation unit 48 of the entertainment module 32 of the aircraft passenger seat unit 18 allows having a secure connection via the data connection provided by the wiring 14 of the in-flight entertainment system, which is originally non-safeguarded. This allows advantageously using a structure that is usually present in aircraft devices 10, namely the structure of the in-flight entertainment system, for the communication between the operating program of the PED 40 and the control and regulation unit 38, in a simple advantageous manner. Principally it would also be conceivable that the operating program of the PED 40 is directly coupled with the control and regulation unit 38 of the aircraft passenger seat unit 18 or with the IFE control and regulation unit 48. For this purpose the aircraft passenger seat unit 18 would comprise a separate communication module implemented as a WLAN module, a Bluetooth® module, an NFC module or another module configured for wireless transfer that is deemed expedient by someone skilled in the art. Herein a pairing process, which could correspond to the above-described pairing process, would still be useful for the direct connection of the operating program of the PED 40 to the aircraft passenger seat unit 18.

If the operating program of the PED 40 is securely connected to the IFE control and regulation unit 48, and thus to the control and regulation unit 38 of the aircraft passenger seat unit 18, it is possible to control the aircraft passenger seat unit 18 via the operating program. By the communication module 12 of the aircraft device 10, control signals are transmitted to the control and regulation unit 38 via the IFE control and regulation unit 48, and following this the control and regulation unit 38 actuates the respective modules 26, 28, 32 of the aircraft passenger seat unit 18 accordingly. For safeguarding, control signals of the PED 40 which is coupled with the aircraft passenger seat unit 18 are overridden by control signals transmitted to the control and regulation unit 38 by the operating module 60 of the aircraft passenger seat unit 18. The operating module 60 constitutes a principal operating element of the aircraft passenger seat unit 18 and is rated by the control and regulation unit 38 to be dominant over the operating program of the PED 40, which is a secondary operating element. This allows easy compensation of potential malfunctioning of the PED 40 or of the operating program running on it by the passenger as the control signals of the operating program are overridden by the control signals of the operating module 60. In the following different ways of operating and implementing the operating program will be described. These explanations are not to be understood as final.

The operating program comprises a variety of user interfaces which are graphically representable on the touch-screen element of the PED 40. A first user interface is embodied as a main menu. Herein, in a first user interface embodied as a main menu, in a state in which the operating program is not connected to an aircraft passenger seat unit 18, 20, 22, the button is indicated which is configured to start a pairing process. In a state when connected to an aircraft passenger seat unit 18, 20, 22, the first user interface forms a plurality of sub-buttons, which may be selected by touching the respective area on the touch-screen element 44 of the PED 40.

The operating program of the PED 40 is configured to actuate a light control unit of the respective aircraft passenger seat unit 18. The light control unit is embodied as part of the control and regulation unit 38. Principally it is also conceivable that the light control unit is embodied as an independent control unit. The light control unit is configured to control the light module 28 of the aircraft passenger seat unit 18. Via the operating program it is possible to actuate the light module 28 of the aircraft passenger seat unit 18 and thus to regulate an illumination within the aircraft passenger seat unit 18. For the purpose of controlling the light module 28 of the aircraft passenger seat unit 18, the operating program comprises a light-controlling user interface, which is preferably selectable directly via one of the submenu buttons from the user interface which is embodied as a main menu. In the light-controlling user interface buttons are provided for light elements of the light module 28, which are actuatable via the light control unit, via which buttons the light elements may be respectively switched on and off, dimmed and/or modified regarding colors. For this purpose the light-controlling user interface implements virtual slide regulators, by means of which a brightness of the light elements and/or a color of the light elements are respectively adjustable separately. The light-controlling user interface further comprises buttons via which a variety of basic settings, like different basic colors or different pre-determined levels of brightness, are adjustable directly.

The operating program of the PED 40 is configured to actuate a seat position control unit of the respective aircraft passenger seat unit 18, 20, 22. The seat position control unit 18 is embodied as part of the control and regulation unit 38. Principally it is also conceivable that the seat position control unit 18 is embodied as an independent controlling unit. The seat position control unit 18 is configured to control the actuator module 26 of the aircraft passenger seat 24. By way of the operating program it is possible to actuate the actuator module 26 of the aircraft passenger seat 24 and to thus carry out an adjustment of the seat position of the aircraft passenger seat 24. For controlling the actuator module 26 of the aircraft passenger seat 24, the operating program comprises a seat-adjustment user interface, which is preferably selectable directly via one of the submenu buttons from the user interface which is embodied as a main menu. In the seat-adjustment user interface for adjustable elements of the aircraft seat 24, like in particular the backrest and the footrest, buttons are provided via which the adjustable elements are actuatable. The seat-adjustment user interface also forms a button via which the entire aircraft passenger seat 24 is continuously adjustable between an upright TTL seat position and the lying-down position. It is herein conceivable that the seat-adjustment user interface forms a virtual slide regulator, via which a passenger may continuously adjust the seat position. Furthermore it is conceivable that the passenger may input specific seat angles via an input box in the seat-adjustment user interface. For the purpose of quickly orienting the aircraft passenger seat 24 in different basic positions, like in particular the upright seat position, the lying-down position or a comfort position, the seat-adjustment user interface comprises buttons via which these seat positions are adjusted directly.

The operating program of the PED 40 is configured to actuate a comfort control unit and an entertainment control unit of the respective aircraft passenger seat unit 18. The comfort control unit and the entertainment control unit are respectively embodied as part of the control and regulation unit 38. Principally it is also conceivable that the comfort control unit and the entertainment control unit are each embodied as independent control units. The comfort control unit is configured for controlling the comfort module of the aircraft passenger seat 24. The entertainment control unit is configured for controlling the entertainment module 32 of the aircraft passenger seat unit 18. For actuating the comfort control unit and the entertainment control unit, the operating program features respective independent user interfaces, which are preferably each selectable directly via one of the submenu buttons from the user interface which is embodied as the main menu. The user interfaces herein respectively have, like the user interfaces described above, buttons via which the different functions of the comfort module—respectively the entertainment module 32—are implementable.

The operating program of the PED 40 comprises a quick-operating user interface. The quick-operating user interface is herein preferably selectable directly via one of the submenu buttons from the user interface which is embodied as the main menu. The operating program of the PED 40 provides a plurality of operating clusters 50, 52, 54, 56. Each of the operating clusters 50, 52, 54, 56 comprises in the quick-operating user interface respectively one button via which the corresponding operating cluster 50, 52, 54, 56 is selectable. Each of the operating clusters 50, 52, 54, 56 comprises a plurality of operative parameters. Each of the operative parameters is herein configured to adjust a function or an adjustable module 26, 28, 32 of the aircraft passenger seat unit 18. By selecting an operating cluster 50, 52, 54, 56 a plurality of modules 26, 28, 32 of the aircraft passenger seat unit 18 are adjusted simultaneously. Herein a first operating cluster 50 is embodied as a sleep operating element. The first operating cluster 50 comprises, as an example, a first operative parameter corresponding to a lying-down position of the aircraft passenger seat 24, and comprises a second operative parameter adjusting the illumination of the aircraft passenger seat unit 18 to a minimum via the light module 28 or switching off the illumination completely. Further operating clusters 52, 54, 56 could, for example, be implemented as a work operating element, as a comfort operating element or as an eating operating element. Herein, applying of the different operating clusters 50, 52, 54, 56, results in each case in an adjustment of a plurality of functions of the aircraft passenger seat unit 18, like in particular an adaption of a seat position of the aircraft passenger seat 24 and of an illumination in the aircraft passenger seat unit 18 being adapted. Herein, by activating the operating cluster 52 implemented as a work operating element, the aircraft passenger seat unit 18 is brought into an optimum upright position for working and an illumination of the aircraft passenger seat unit 18 is optimized. By activating the operating cluster 56 implemented as an eating operating element, the aircraft passenger seat unit 18 is moved into an optimum position for eating. By activating the operating cluster 54 implemented as a comfort operating element, the aircraft passenger seat unit 18 is brought into a comfort position.

The operating program of the PED 40 is configured for memorizing a user's favorite settings for an aircraft passenger seat unit 18. Herein the user may store a variety of favorite settings, like in particular a seat position of the aircraft passenger seat 24 and an illumination in the aircraft passenger seat unit 18 as well as, for example, a temperature of a seat heating, in a favorite operating cluster 58. This favorite operating cluster 58 is herein also represented in the quick-operating user interface of the operating program. A passenger may herein store at least one favorite operating cluster 58 in the operating program of the PED 40. Principally it is also conceivable that the passenger is enabled to store several such favorite operating clusters 58 in the operating program of the PED 40.

The PED 40 comprises a plurality of input facilities and sensors (not shown in detail), like in particular a microphone, a tilt sensor, an acceleration sensor and a lighting sensor. The PED 40 may comprise further input facilities which are deemed expedient by someone skilled in the art. Herein the list given above is not intended to be final. The operating program of the PED 40 comprises an operating function, in which an input of the operator made via one of the above-mentioned input facilities results in a control signal being outputted to the control and regulation unit 38. It is herein conceivable, for example, to use for controlling the seat position control unit the sensor signals of the tilt sensor to thus implement a seat adjustment via tilting the PED 40. In a further operating function the operating program is voice-controllable via the microphone. Herein all of the above-described functions of the operating program of the PED 40 are operable via voice control.

Via the communicating unit 16 of the aircraft device 10 information from the control and regulation unit 46 of the communication module 12 as well as information from the control and regulation unit 38 of the aircraft passenger seat unit 18 are transferable to the operating system. Herein safety instructions may be rendered automatically before a flight by the operating program of the PED 40. For example, current flight data as well as information from the cockpit may be transmitted to the operating program of the PED 40 and may be displayed on the PED 40. In an emergency operating mode, it is possible, by means of the communicating unit 16, to order the operating program of the PED 40 to terminate all communication modules of the PED 40 and to switch the PED 40 into flight mode.

The system comprises a further PED 62. The PED 62 is also embodied as a smartphone. The further PED 62 is configured to be used by staff for a maintenance function. The PED 62 also comprises an operating program, which differs from the operating program of the PED 40 intended for passengers. The operating program of the PED 62 has a maintenance function. The maintenance function is configured for reading out different maintenance-relevant parameters from the aircraft passenger seat unit 18, 20, 22. Differently from the operating program of the PED 40, the operating program of the PED 62, which has the maintenance function, does not need to be coupled separately with each aircraft passenger seat unit 18, 20, 22 individually. The PED 62 is wirelessly connected to the aircraft device 10 via the communication module 12 of the aircraft device 10. Via the communication module 12 the operating program of the PED 62 is directly connectable to each aircraft passenger seat unit 18, 20, 22 which is in connection with the communication module 12. Herein no pairing process is necessary for connecting the operating program of the PED 62 directly to an aircraft passenger seat unit 18, 20, 22 and communicating with the corresponding control and regulation unit 38. For the purpose of selecting one of the aircraft passenger seat units 18, 20, 22, the operating program of the PED 62 comprises a selection user interface, via which each of the aircraft passenger seat units 18, 20, 22 is selectable separately. The selection user interface may herein comprise a graphic representation of all aircraft passenger seat units 18, 20, 22 mounted in the aircraft cabin, in which graphic representation a respective aircraft passenger seat unit 18, 20, 22 is selectable by clicking on a respective area. Principally it is also conceivable that the selection user interface comprises, for example, one respective selecting field with respective seat numbers for each aircraft passenger seat unit 18, 20, 22. When a respective aircraft passenger seat unit 18, 20, 22 has been selected by means of the selection user interface, the operating program of the PED 62 is configured with its maintenance function to read out maintenance-relevant parameters from the aircraft passenger seat unit 18, 20, 22 and to indicate these on the PED 62. For the representation of the different maintenance-relevant parameters from the respective selected aircraft passenger seat unit 18, 20, 22, the operating program of the PED 62 comprises different secondary user interfaces, in which the different maintenance-relevant parameters are indicated in respective functional groups. Maintenance-relevant parameters are herein, for example, serial numbers of the different structural components of the respective aircraft passenger seat unit 18, 20, 22, different controlling intervals or a current status of the different modules 26, 28, 32 of the aircraft passenger seat unit 18, 20, 22.

The operating programs of the two PEDs 40, 62 are different from one another. The operating program of the PED 40 is configured to be used by a passenger. Herein the operating program is implemented as an operating program of an airline in which the corresponding system according to the invention is used. It is herein conceivable that the operating program is only part of a larger, more comprehensive operating program provided by the airline. The operating program of the PED 62 is only intended for authorized persons, in particular for maintenance personnel of an aircraft cabin. The operating program of the PED 62, in particular the maintenance function, is not configured to be used by a passenger.

REFERENCE NUMERALS

10 aircraft device
12 communication module
14 wiring
16 communicating unit
18 aircraft passenger seat unit
20 aircraft passenger seat unit
22 aircraft passenger seat unit
24 aircraft passenger seat
26 actuator module
28 light module
30 shell module
32 entertainment module
34 display element
36 input element
38 control and regulation unit
40 PED
42 operating element
44 touch-screen element
46 control and regulation unit
48 IFE control and regulation unit
50 operating cluster
52 operating cluster
54 operating cluster
56 operating cluster
58 favorite-operating cluster
60 operating module
62 PED

The invention claimed is:

1. A system comprising:
an aircraft device comprising at least one control and/or regulation unit, wherein the control and/or regulation unit is configured to control an aircraft passenger seat unit and has at least one controller with a processor, memory, and an operating program stored in the memory,
wherein the aircraft passenger seat unit comprises at least one operating module, which is configured for outputting seat control signals to the control and/or regulation unit, wherein the at least one operating module comprises a plurality of operating elements which are configured to directly control the aircraft passenger seat unit and are arranged on the aircraft passenger seat unit within reach of a passenger sitting on an aircraft passenger seat of the aircraft passenger seat unit, wherein the operating elements are push buttons or touchscreen buttons, wherein the aircraft passenger seat comprises an actuator module to adjust the aircraft passenger seat,
a personal electronic device (PED) in which at least one operating program is stored, which is configured to be used by the passenger to actuate the actuator module of the aircraft passenger seat and adjust of a seat position of the aircraft passenger seat, wherein the control and/or regulation unit is configured to receive control signals from the PED for controlling the aircraft passenger seat unit, wherein seat control signals of the operating module override seat control signals of the PED that is coupled with the aircraft passenger seat unit, wherein the seat control signals of the operating module of the aircraft passenger seat unit have a higher priority than the seat control signals of the PED such that the seat control signals of the aircraft passenger seat unit entered via the operating module are processed by the control and/or regulation unit with priority and the seat control signals of the operating program of the PED are not processed.

2. The system according to claim 1, wherein the aircraft device comprises at least one communication module, via which the PED is wirelessly couplable with the aircraft device.

3. The system according to claim 2, wherein a plurality of PEDs are wirelessly couplable with the aircraft device via the communication module to actuate different aircraft passenger seat units.

4. The system according to claim 2, wherein the operating program of the PED is configured to communicate, via the communication module with only one of the aircraft passenger seat units.

5. The system according to claim 2, wherein the operating program of the PED is configured to be unambiguously allocated to one single aircraft passenger seat unit by a pairing process.

6. The system according to claim 5, wherein, in the pairing process, the PED is configured to process a pairing code provided by the aircraft passenger seat unit and to output a corresponding signal to the communication module of the aircraft device.

7. The system according to claim 6, further comprising at least one aircraft passenger seat unit comprising at least one display element, which is configured to provide the pairing code for the pairing process.

8. The system according to claim 7, wherein the aircraft passenger seat unit comprises at least one operating element, which must be operated for generating the pairing code.

9. The system according to claim 6, wherein the pairing code comprises at least one parameter, which is configured for an identification of the corresponding aircraft passenger seat unit.

10. The system according to claim 6, wherein the pairing code comprises at least one further parameter showing an equipment of the aircraft passenger seat unit.

11. The system according to claim 5, wherein the PED and/or the aircraft device is configured for establishing an encoded connection between the PED and the one aircraft passenger seat unit which is to be operated.

12. The system according to claim 1, wherein the operating program of the PED is at least configured for actuating a seat position control unit of the respective aircraft passenger seat unit.

13. The system according to claim 1, wherein the operating program of the PED renders at least one operating cluster available.

14. The system according to claim 13, wherein the at least one operating cluster comprises a plurality of operative parameters of the aircraft passenger seat unit.

15. The system according to claim 1, wherein the operating program of the PED is configured to memorize a user's favorite settings for an aircraft passenger seat unit.

16. An aircraft passenger seat unit according to claim 1, which is configured to be controlled via the PED by an operating program of the PED.

17. A method for controlling the aircraft passenger seat unit according to claim 1.

* * * * *